United States Patent
Kaise et al.

(10) Patent No.: US 12,513,418 B2
(45) Date of Patent: Dec. 30, 2025

(54) IMAGING DEVICE, IMAGING METHOD, RECORDING MEDIUM, AND MOBILE BODY

(71) Applicant: Panasonic Intellectual Property Management Co., Ltd., Osaka (JP)

(72) Inventors: Gou Kaise, Kanagawa (JP); Tomokazu Deki, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 210 days.

(21) Appl. No.: 18/365,518

(22) Filed: Aug. 4, 2023

(65) Prior Publication Data

US 2023/0379591 A1 Nov. 23, 2023

Related U.S. Application Data

(63) Continuation of application No. PCT/JP2021/039912, filed on Oct. 28, 2021.

(30) Foreign Application Priority Data

Feb. 9, 2021 (JP) .................................. 2021-018702

(51) Int. Cl.
*H04N 23/88* (2023.01)

(52) U.S. Cl.
CPC .................................. *H04N 23/88* (2023.01)

(58) Field of Classification Search
CPC ........ H04N 23/88; H04N 1/6077; H04N 9/73; H04N 23/741
See application file for complete search history.

(56) References Cited

U.S. PATENT DOCUMENTS

| 5,291,276 A | 3/1994 | Matsumoto et al. |
| 8,049,790 B2 * | 11/2011 | Kakinuma ............. H04N 23/74 348/223.1 |
| 2008/0068468 A1 | 3/2008 | Kitajima |

(Continued)

FOREIGN PATENT DOCUMENTS

| JP | H0564234 A | 3/1993 |
| JP | H09307923 A | 11/1997 |

(Continued)

OTHER PUBLICATIONS

International Search Report, mailed Dec. 14, 2021, for International Application No. PCT/JP2021/039912. (2 pages) (English translation).

*Primary Examiner* — Abdelaaziz Tissire
(74) *Attorney, Agent, or Firm* — Seed Intellectual Property Law Group LLP (57) ABSTRACT

An imaging device includes a calculator, a white balance corrector, and a white balance corrector. The calculator calculates a white balance gain and an inverse gain on the basis of a first image. The white balance gain is used for correcting white balance. The inverse gain is a reciprocal number of the white balance gain. The white balance corrector corrects white balance of a captured image on the basis of the white balance gain. The white balance corrector generates a first image and outputs the generated first image to the calculator. The first image is generated by performing inverse gain correction in which the captured image whose white balance has been corrected is multiplied by the inverse gain.

7 Claims, 7 Drawing Sheets

(56) References Cited

U.S. PATENT DOCUMENTS

| | | | |
|---|---|---|---|
| 2008/0111896 A1* | 5/2008 | Yoshino | H04N 23/88 348/E5.031 |
| 2014/0168463 A1* | 6/2014 | Tamura | H04N 23/88 348/223.1 |
| 2015/0281545 A1 | 10/2015 | Aokage | |
| 2017/0111625 A1* | 4/2017 | Yao | G06T 5/00 |
| 2017/0366723 A1* | 12/2017 | Kurata | H04N 25/131 |
| 2019/0356892 A1* | 11/2019 | Takasumi | H04N 1/6027 |
| 2021/0258553 A1* | 8/2021 | Shin | H04N 23/843 |
| 2021/0377504 A1* | 12/2021 | Jang | H04N 25/134 |

FOREIGN PATENT DOCUMENTS

| | | | |
|---|---|---|---|
| JP | 2008072575 A | 3/2008 | |
| JP | 2009017301 A | 1/2009 | |
| JP | 2010183442 A | 8/2010 | |
| JP | 2015201842 A | 11/2015 | |

\* cited by examiner

FIG.5B

IMAGING DEVICE, IMAGING METHOD, RECORDING MEDIUM, AND MOBILE BODY

CROSS-REFERENCE TO RELATED APPLICATIONS

This application is a continuation of International Application No. PCT/JP2021/039912, filed on Oct. 28, 2021 which claims the benefit of priority of the prior Japanese Patent Application No. 2021-018702, filed on Feb. 9, 2021, the entire contents of which are incorporated herein by reference.

FIELD

The present disclosure relates generally to an imaging device, an imaging method, a recording medium, and a mobile body.

BACKGROUND

As a method of correcting white balance of an image, a method of correcting white balance by feedback control has been known. In the feedback control, a white balance gain is calculated by an image frame whose white balance has been corrected, and, by the calculated white balance gain, white balance of a next image frame is corrected (for example, Japanese Patent Application Laid-open No. H9-307923).

In such a related art, however, image quality sometimes deteriorates due to deviation of white balance caused by a change in color temperature of a subject.

SUMMARY

An imaging device according to the present disclosure includes a calculator, a white balance corrector, and a white balance corrector. The calculator calculates a white balance gain and an inverse gain on the basis of a first image. The white balance gain is used for correcting white balance. The inverse gain is a reciprocal number of the white balance gain. The white balance corrector corrects white balance of a captured image on the basis of the white balance gain. The white balance corrector generates a first image and outputs the generated first image to the calculator. The first image is generated by performing inverse gain correction in which the captured image whose white balance has been corrected is multiplied by the inverse gain.

DETAILED DESCRIPTION

Hereinafter, embodiments of an imaging device, an imaging method, a recording medium, and a mobile body according to the present disclosure will be described with reference to the accompanying drawings.

Figure 1:
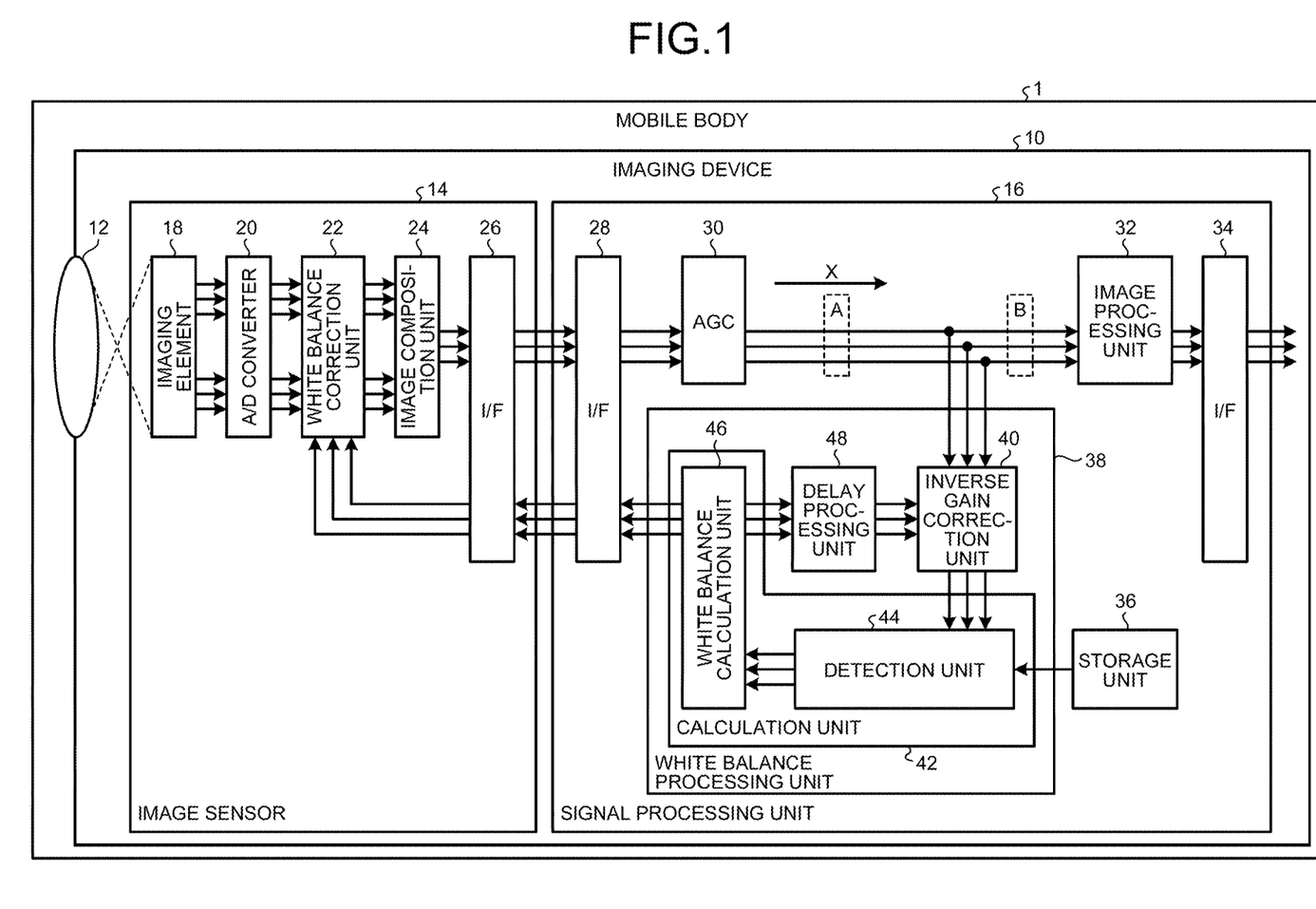
FIG. 1 is a diagram illustrating an example of an imaging device according to an embodiment.

FIG. 1 is a diagram illustrating an example of an imaging device 10 according to the present embodiment.

In the present embodiment, a mode that the imaging device 10 is mounted on a mobile body 1 will be described as an example.

The mobile body 1 is a movable object. The mobile body 1 is, for example, a vehicle, a flyable object, a robot, or the like. Examples of the flyable object include a manned airplane and an unmanned airplane. The unmanned airplane is, for example, an unmanned aerial vehicle (UAV), a drone, or the like. In addition, the mobile body 1 is, for example, a mobile body that travels through a driving operation by a person or a mobile body that can autonomously travel without a driving operation by a person. In the present embodiment, a case where the mobile body 1 is a vehicle will be described as an example. Examples of the vehicle include a two-wheeled automobile, a three-wheeled automobile, and a four-wheeled automobile.

Note that the mode of the imaging device 10 is not limited to the mode of being mounted on the mobile body 1. The imaging device 10 may be mounted on a stationary object. The stationary object includes an object fixed to the ground. The stationary object is an immovable object or an object in a stationary state with respect to the ground. The stationary object is, for example, a construction such as a building.

The imaging device 10 captures an image of a subject and obtains captured image data. The captured image data is video data or moving image data formed by a plurality of consecutive frames or still images. In the present embodiment, description will be given by assuming a case where the captured image data is the video data formed by a plurality of consecutive frames. In addition, each of the frames will be simply referred to as a captured image.

Figure 2:
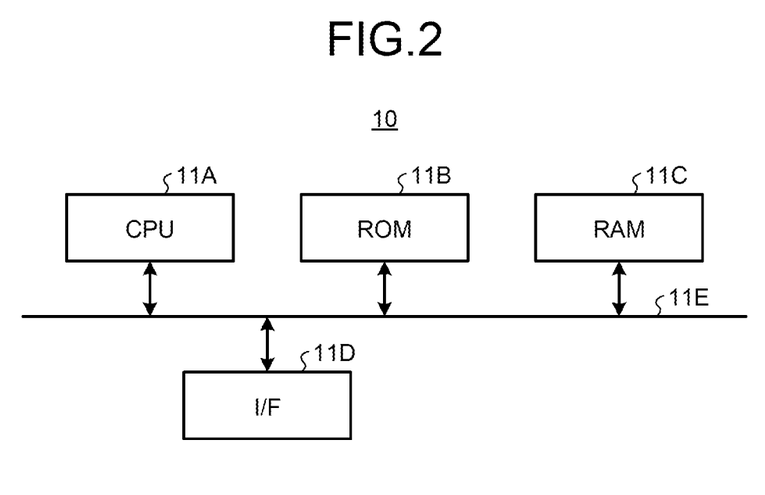
FIG. 2 is a diagram illustrating an example of a hardware configuration diagram.

FIG. 2 is an example of a hardware configuration diagram of the imaging device 10.

The imaging device 10 has a hardware configuration using a normal computer in which a central processing unit (CPU) 11A, a read only memory (ROM) 11B, a random access memory (RAM) 11C, an I/F 11D, and the like are connected to each other via a bus 11E.

The CPU 11A is a computation device that controls the imaging device 10 of the present embodiment. The ROM 11B stores programs and the like that implement various processes executed by the CPU 11A. The RAM 11C stores data necessary for the various processes executed by the CPU 11A. The OF 11D is an interface configured for transmission and reception of data.

A computer program for execution of information processing executed by the imaging device 10 of the present embodiment is provided by being incorporated in the ROM 11B or the like in advance. Note that the computer program executed by the imaging device 10 according to the present embodiment may be provided by being recorded in a computer-readable recording medium such as a CD-ROM, a flexible disk (FD), a CD-R, or a digital versatile disk (DVD) as a file in a format that can be installed or executed in the imaging device 10.

Returning to FIG. 1, description will be continued. The imaging device 10 includes a lens 12, an image sensor 14, and a signal processing unit 16. The image sensor 14 and the signal processing unit 16 are connected so as to transmit and receive signals and/or data between them.

The image sensor 14 obtains a captured image of a subject by imaging. In the present embodiment, the image sensor 14 includes an imaging element 18, an analog-to-digital (A/D) converter 20, a white balance correction unit (or a white balance corrector) 22, an image composition unit (or a compositor) 24, and an interface (I/F) 26. These units are connected so as to communicate with each other. Note that the image sensor 14 may employ a configuration in which the image composition unit 24 is not provided. In the present embodiment, a case where the image sensor 14 includes the image composition unit 24 will be described as an example.

The imaging element 18 outputs a signal corresponding to the intensity of light received via the lens 12. The imaging element 18 is a known photoelectric conversion element. The photoelectric conversion element is, for example, a charge coupled device (CCD), a complementary metal-oxide-semiconductor (CMOS), or the like. For example, in a case where the CMOS sensor is used as the imaging element 18, the captured image can be obtained by accumulating charge generated by incident light entering a photodiode through a lens. Luminance of the captured image is adjusted by appropriately controlling the time for accumulating the charge.

The A/D converter 20 converts an analog signal output from the imaging element 18 into the captured image as digital data.

The white balance correction unit 22 corrects white balance of the captured image on the basis of a white balance gain calculated by the signal processing unit 16 which will be described later in detail. The white balance correction unit 22 multiplies a signal of each of color components of pixels included in the captured image received from the A/D converter 20, by the white balance gain received from the signal processing unit 16. The signal of the color component of the pixel is represented by, for example, a signal of each of color components of red (R), green (G), and blue (B), which are primary color signals. Note that the signals of the color components of the pixels are not limited to the RGB primary color signals. In the present embodiment, a case where the signal of the color component of the pixel is represented by each of the color component signals of RGB primary color signals is described as an example. Hereinafter, there is a case where a signal of R which is one of the color components is simply referred to as R, a signal of G which is one of the color components is simply referred to as G, and a signal of B which is one of the color components is simply referred to as B. The white balance of the captured image is corrected by multiplying each of RGB of each of the pixels by the white balance gain. Hereinafter, the correction of the white balance is sometimes simply referred to as the white balance correction.

The image composition unit 24 performs composition of captured images which have been subjected to the white balance correction and have mutually different exposure levels. The composition processing performed by the image composition unit 24 is sometimes referred to as high-dynamic range (HDR) composition processing. In the present embodiment, the imaging element 18 captures multiple images having mutually different exposure levels. The image composition unit 24 performs composition of the captured images, which have been subjected to the white balance correction and have mutually different exposure levels, to be a captured image for one frame. The composited image generated by the image composition unit 24 is output to the signal processing unit 16 via the I/F 26.

The signal processing unit 16 executes various types of signal processing on the captured image received from the image sensor 14. The signal processing unit 16 includes an I/F 28, an AGC 30, an image processing unit 32, an I/F 34, a storage unit 36, and a white balance processing unit 38. These units are connected so as to communicate with each other.

The auto gain control (AGC) 30 adjusts luminance or brightness of the captured image received from the image sensor 14 via the I/F 28, and outputs the captured image to the image processing unit 32 and the white balance processing unit 38. The image processing unit 32 performs various types of known image processing, such as γ correction and contrast correction, on the captured image received from the AGC 30. The image processing unit 32 outputs the captured image having been subjected to the image processing to the outside of the imaging device 10 via the I/F 34.

The captured image output from the imaging device 10 is output to, for example, a power control unit or the like of the mobile body 1. The power control unit of the mobile body 1 uses, for example, the captured image output from the imaging device 10 to perform vehicle control so as to keep a currently traveling lane while avoiding an obstacle and to keep an inter-vehicle distance to a preceding vehicle to be a predetermined distance or more.

The white balance processing unit 38 executes processing related to computation of the white balance gain.

The white balance processing unit 38 includes an inverse gain correction unit (or an inverse gain corrector) 40, a calculation unit (or a calculator) 42, and a delay processing unit (or a delay processor) 48. The calculation unit 42 includes a detection unit (or a detector) 44 and a white balance calculation unit (or a white balance calculator) 46. These units are connected so as to communicate with each other.

The inverse gain correction unit 40 receives the captured image, whose white balance has been corrected by the white balance correction unit 22, via the AGC 30, the I/F 28, the I/F 26, and the image composition unit 24. The inverse gain correction unit 40 generates a first image by performing inverse gain correction on the captured image having been subjected to the white balance correction.

An inverse gain refers to a reciprocal number of the white balance gain, which is used for the white balance correction. The inverse gain correction is performed by multiplying the captured image having been subjected to the white balance correction, by the inverse gain. Specifically, the inverse gain correction unit 40 multiplies each of RGB being color component signals of each of pixels included in the captured image having been subjected to the white balance correction, by the inverse gain computed by the calculation unit 42 which will be described later. A captured image before the white balance correction is created by multiplying each of RGB of each of the pixels by the inverse gain. The first image is, namely, a captured image in which white balance before the white balance correction is restored by the inverse gain correction unit 40 after white balance is corrected.

The calculation unit 42 computes the white balance gain used for the white balance correction and the inverse gain of the white balance gain on the basis of the first image received from the inverse gain correction unit 40. In this manner, the calculation unit 42 computes the white balance gain and the inverse gain by using the first image corresponding to a captured image whose white balance is not yet corrected.

As described above, the calculation unit 42 includes the detection unit 44 and the white balance calculation unit 46.

The detection unit 44 detects an in-frame region in the first image obtained by the inverse gain correction unit 40 as a captured image before the white balance correction. The in-frame region refers to a color temperature region in a white detection frame arranged in a color temperature space. The color temperature is a measure for expressing a color of light emitted from various light sources in a quantitative numerical value. The color temperature takes a value correlated with a temperature of a black body. The unit of the color temperature is Kelvin (K). The color temperature is represented by, for example, color difference information. The white detection frame will be described later.

Figure 3A:
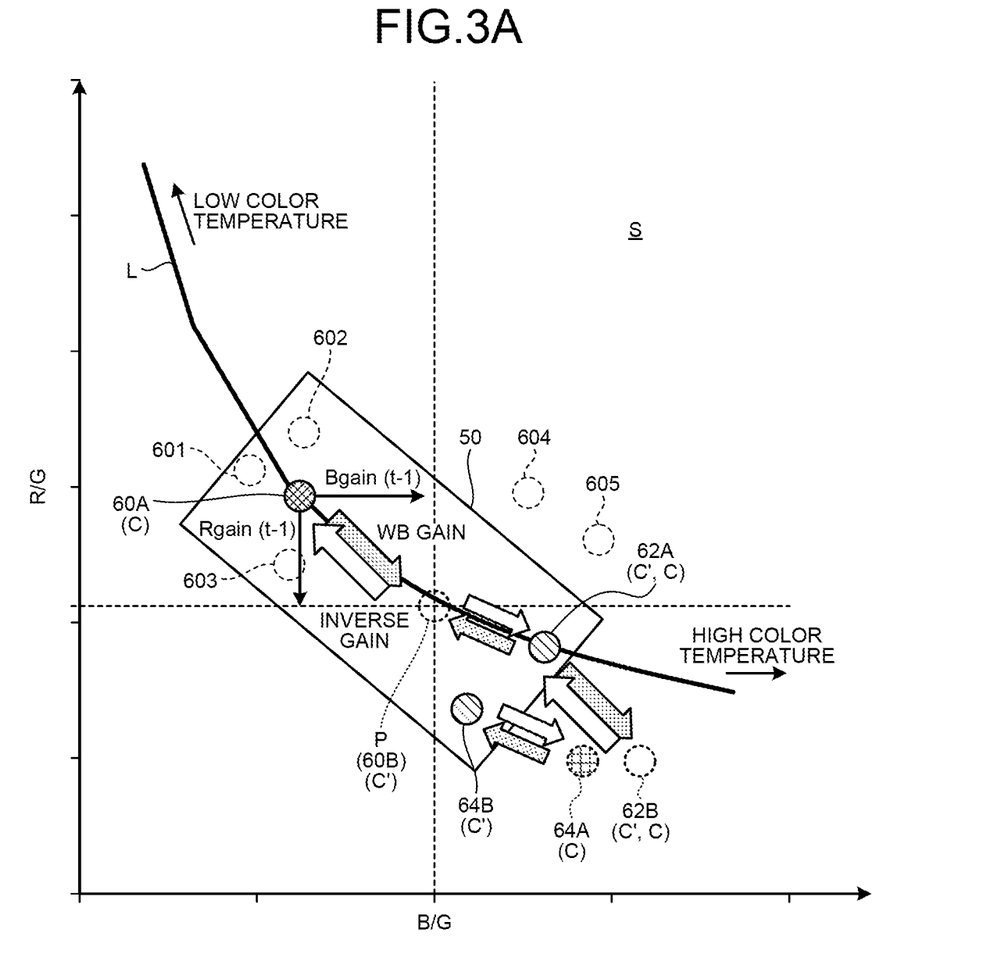
FIG. 3A is an explanatory view of an example of white balance correction according to the embodiment.

FIG. 3A is an explanatory view of an example of the white balance correction according to the present embodiment. A color temperature space S is a multi-dimensional space expressing the color temperature. The color temperature space S is expressed by, for example, a multi-dimensional space having color difference information as axes. In FIG. 3A, as an example, the color temperature space S having axes of R/G and B/G, which are pieces of color difference information. R/G denotes a ratio of red (R) to green (G). B/G denotes a ratio of blue (B) to G. Note that the color difference information as the coordinate axes of the color temperature space S is not limited to the ratios between RGB. For example, the color difference information may be signal differences of RGB such as an R-G signal and a B-G signal, or color difference signals indicated by R-Y and B-Y using a luminance signal Y obtained by adding RGB at a specific ratio.

The detection unit 44 sets a white detection frame 50 in the color temperature space S. The white detection frame 50 is a frame representing a target region where white balance is to be corrected in the color temperature space S. In other words, the white detection frame 50 is a frame for limiting a range of color temperatures set as a computation target of the white balance gain. A setting value of the white detection frame 50 may be stored in advance in the storage unit 36, for example. It is sufficient for the detection unit 44 to read the setting value of the white detection frame 50 from the storage unit 36 and set the setting value in the color temperature space S. Note that the setting value of the white detection frame 50 may be changeable in accordance with an operation instruction or the like from a user.

The white detection frame 50 is set in a region along a black-body radiation curve L in the color temperature space S. This is because the white detection frame 50 is a frame used for determining a color temperature close to the black-body radiation curve L as a white component that needs to be brought close to achromatic white. In the case of the color temperature space S having R/G and B/G as the coordinate axes, the black-body radiation curve L is plotted in the form of a quadratic curve from the low color temperature side to the high color temperature side, as illustrated in FIG. 3A.

In FIG. 3A, the white detection frame 50 is shaped in a quadrangle as an example. However, the white detection frame 50 is not limited to the quadrangle such as a rectangle.

The detection unit 44 detects the in-frame region having a color temperature within the white detection frame 50 in the first image. In the present embodiment, as one example, the detection unit 44 detects, as the in-frame region, pixels each having a color temperature within the white detection frame 50 in the first image.

A color temperature of white in the captured image obtained by the imaging element 18 moves along the black-body radiation curve L in the color temperature space S in accordance with a change in a color temperature of a light source. As the color temperature moves along the black-body radiation curve L, even an object with actually white is sometimes captured as colored white in the captured image. For example, in a case where the color temperature of the light source is a low color temperature, a region whose color is originally white is captured as a reddish color. In addition, in a case where the color temperature of the light source is a high color temperature, a region whose color is originally white is captured as a bluish color.

Therefore, the calculation unit 42 computes the white balance gain for correcting the white balance such that colored white becomes achromatic white with respect to the color temperature of the captured image captured to be reddish, bluish, or the like. In FIG. 3A, a goal point P as the origin is achromatic white. In other words, the goal point P is a coordinate value obtained by converting an RGB luminance ratio as a goal for calculating the white balance gain into color difference information.

First, the detection unit 44 of the calculation unit 42 divides the first image obtained by the inverse gain correction unit 40 into a plurality of areas. The first image corresponds to a captured image before white balance is corrected. Then, the detection unit 44 calculates an integrated value of each of RGB for each divided area. The divided area is, for example, a region of one pixel, but may be a region including two or more pixels. In the present embodiment, a case where each of the areas corresponds to one pixel will be described as an example. The detection unit 44 converts signals of color components of RGB of each of the pixels into color difference information by using the calculated integrated value for each of the pixels. As described above, the color difference information is represented by, for example, R/G and B/G.

Next, the detection unit 44 plots the color difference information obtained for each of the pixels on the color temperature space S. In FIG. 3A, plots 601, 602, 603, 604, and 605 are illustrated as examples. These plots 601 to 605 are examples of plots of pixels having different pieces of color difference information in the first image.

Then, the detection unit 44 detects a pixel that has color difference information falling within the white detection frame 50, thereby detecting a pixel whose color temperature is the in-frame region of the white detection frame 50 in the first image. In the case of the example illustrated in FIG. 3A, the detection unit 44 detects the plots 601 to 603 located within the white detection frame 50 out of the plots 601 to 605. The plots 601 to 603 are detected as pixels of color difference information used for white balance gain calculation. On the other hand, the plots 604 and 605 located outside the frame of the white detection frame 50 are excluded from the target to be subjected to the white balance gain computation.

The detection unit 44 integrates luminance values of RGB of each of the detected pixels, namely, pixels having the color difference information within the white detection frame 50 for each of RGB, and outputs the integrated luminance values to the white balance calculation unit 46. That is, the detection unit 44 calculates the integrated value of the luminance values for each of RGB of each of the pixels having the color difference information within the white detection frame 50 in the first image which corresponds to a captured image before the white balance correction. Then, the detection unit 44 outputs the calculated integrated value of the luminance values for each of RGB to the white balance calculation unit 46. The integrated value of the luminance values for each of RGB corresponds to, for example, a current point C in FIG. 3A. The current point C is obtained by converting the integrated value obtained by integrating the luminance values of RGB in the white detection frame 50 in the first image for each of RGB into color difference information and plotting the color difference information on the color temperature space S. Note that a current point C' to be described later is obtained by converting an integrated value obtained by integrating luminance values of RGB in the white detection frame 50 in the captured image after the white balance correction for each of RGB into color difference information and plotting the color difference information on the color temperature space S.

Returning to FIG. 1, description will be continued. The white balance calculation unit 46 calculates a white balance gain and an inverse gain of the white balance gain, on the basis of the color temperature of the in-frame region that is a region in the white detection frame 50 in the first image. Specifically, the white balance calculation unit 46 calculates the white balance gain by using the integrated value of luminance values for each of RGB of each pixel having the color difference information within the white detection frame 50.

For example, assume that, as illustrated in FIG. 3A, the current point C of the color temperature in the white detection frame 50 of the first image, which is the captured image before the white balance correction, is at a position of a plot 60A of the low color temperature. As described above, the current point C is the color difference information plotted on the color temperature space S. The color difference information is obtained by conversion of the integrated value of luminance values for each of RGB in the white detection frame 50 of the first image, which is output from the detection unit 44 to the white balance calculation unit 46. The white balance calculation unit 46 calculates a white balance gain for bringing a luminance ratio of the current point C closer to a luminance ratio of the goal point P.

Assume that, for example, the current point C is located closer to the lower color temperature side than the goal point P. Specifically, the current point C is located at the position of the plot 60A of the low color temperature. In this case, an R gain and a B gain for bringing the luminance ratio of the current point C close to the luminance ratio of the goal point P satisfy R gain≤1 and B gain≥1, respectively. The R gain means a white balance gain of R, and the B gain means a white balance gain of B. In the present embodiment, a case where the units of these white balance gains are represented by magnifications will be described as an example. Note that the unit of the white balance gain is not limited to the magnification.

On the other hand, assume that the current point C is located closer to the high color temperature side than the goal point P. Specifically, the current point C is located at a position of a plot 62A of the high color temperature. In this case, an R gain and a B gain for bringing the luminance ratio of the current point C close to the luminance ratio of the goal point P satisfy R gain≥1 and B gain≤1, respectively.

In addition, the white balance calculation unit 46 calculates an inverse gain by calculating a reciprocal number of the white balance gain. For example, assume that the white balance gain has values represented by the following expressions (1) and (2).

$$R\_gain(t-1)=1/1.2 \quad (1)$$

$$B\_gain(t-1)=1/0.8 \quad (2)$$

In this case, inverse gains of these white balance gains are values expressed by the following expressions (3) and (4).

$$R\_gain\_inverse(t)=1/(1/1.2)=1.2 \quad (3)$$

$$B\_gain\_inverse(t)=1/(1/0.8)=0.8 \quad (4)$$

In the above expression (1), R_gain(t−1) represents a white balance gain of R calculated from the first image. In the above expression (2), B_gain(t−1) represents a white balance gain of B computed from the first image. R_gain_inverse(t) in the expression (3) represents an inverse gain of R. B_gain_inverse(t) in the expression (4) represents an inverse gain of B.

Returning to FIG. 1, description will be continued. The white balance calculation unit 46 outputs the calculated white balance gain to the white balance correction unit 22, and outputs the calculated inverse gain to the delay processing unit 48.

The white balance correction unit 22 receives the white balance gain from the white balance calculation unit 46 via the I/F 26 and the I/F 28. The white balance correction unit 22 corrects white balance of a newly captured image of a next frame by using the received white balance gain, and outputs the resulting image to the image composition unit 24.

Therefore, the white balance correction by feedback control is performed in the imaging device 10 of the present embodiment. The white balance correction unit 22 is disposed at a preceding stage of the white balance processing unit 38 including the white balance calculation unit 46. Therefore, the imaging device 10 has a configuration including a white balance correction function by a feedback control system.

Meanwhile, the delay processing unit 48 having received the inverse gain from the white balance calculation unit 46 controls a second timing to coincide with the first timing. The first timing is a timing at which a captured image of a frame with corrected white balance is input to the inverse gain correction unit 40. The captured image of this frame is a captured image having been subjected to white balance correction by the white balance correction unit 22 by using the white balance gain calculated by the white balance calculation unit 46. The second timing is a timing at which an inverse gain, which is a reciprocal number of the white balance gain, is input to the inverse gain correction unit 40.

Specifically, for example, the delay processing unit 48 outputs the inverse gain received from the white balance calculation unit 46 to the inverse gain correction unit 40 after holding this inverse gain for an exposure time of the image sensor 14, that is, for a time corresponding to one frame. Note that the delay processing unit 48 only needs to control the second timing such that the first timing coincide with the second timing, and the time during which the delay processing unit 48 holds the inverse gain may vary with a configuration of the image sensor 14. Therefore, the present invention is not limited to the mode of holding the inverse gain during the time corresponding to one frame.

Thus, the captured image of the frame whose white balance has been corrected by the white balance correction unit 22 and the inverse gain of the white balance gain used for the white balance correction of the captured image of the frame are input to the inverse gain correction unit 40 at the same timing. Therefore, the inverse gain correction unit 40 can correct the captured image having been subjected to the white balance correction to the first image being a captured image before the white balance correction, and can output the first image to the calculation unit 42. As described above, the calculation unit 42 computes the white balance gain and the inverse gain by using the first image.

In this manner, in the imaging device 10 of the present embodiment, the white balance gain is calculated using the first image obtained by the inverse gain correction unit 40, which corresponds to a captured image before the white balance correction, instead of using the captured image whose white balance has been corrected.

Therefore, in the imaging device 10 of the present embodiment, it is possible to suppress the image quality degradation caused by deviation of the white balance due to a change in a color temperature of the subject in a device that executes the white balance correction by the feedback control.

The above effect will be specifically described with reference to FIG. 3A.

Assume that the current point C of the first image, which is the captured image before the white balance correction, is located at the position of the plot 60A of the low color temperature, as illustrated in FIG. 3A. In this case, the current point C is corrected to the current point C' at the position of a plot 60B being the goal point P by being multiplied by a white balance gain by the white balance correction unit 22.

The white balance gain for this white balance correction is calculated by using the first image of the captured image of an immediately previous frame by feedback control of the white balance processing unit 38, and is input to the white balance correction unit 22. In FIG. 3A, Bgain(t−1) represents a white balance gain of a color component B calculated from the first image of the captured image of the immediately previous frame. In addition, Rgain(t−1) represents a white balance gain of a color component R calculated from the first image of the captured image of the immediately previous frame.

The imaging device 10 according to the present embodiment executes the white balance correction by the feedback control. In addition, in the imaging device 10 of the present embodiment, the white balance gain is computed by using the first image obtained by the inverse gain correction unit 40, which corresponds to a captured image before the white balance correction, instead of using the captured image whose white balance has been corrected. In the color temperature space S, it can be seen that the current point C' is corrected again from the goal point P to the current point C before the white balance correction. Then, in the imaging device 10 of the present embodiment, the white balance gain is calculated by using the integrated value corresponding to the color difference information of the current point C before the white balance correction.

Therefore, in the imaging device 10 of the present embodiment, the white balance gain is computed by using the color difference information of the position of the plot 60A restored to the state before the correction by the inverse gain correction, instead of the plot 60B, which is the plot after the white balance correction, at the time of computing the white balance gain to be used in the captured image of the next frame. In other words, the white balance calculation unit 46 calculates the white balance gain by not using the plot 60B that is the current point C' of the captured image after the white balance correction but instead using the plot 60A that is the current point C of the first image corresponding to a captured image before the white balance correction.

Therefore, in the imaging device 10 of the present embodiment, it is possible to suppress the current point C, which is to originally fall within the white detection frame 50, from deviating from the white detection frame 50 even in a case where a color temperature between frames greatly changes on the color temperature space S.

Consequently, it is possible to suppress the image quality degradation due to the deviation of the white balance in the imaging device 10 of the present embodiment.

Here, assume that the color temperature of the subject greatly changes between frames. A scene where the color temperature of the subject greatly changes between frames is, for example, a scene where the mobile body 1 on which the imaging device 10 is mounted is traveling near an entrance of a tunnel, a scene where strong sunlight of the morning sun, the evening sun, or the like abruptly enters the lens 12, a scene where a sudden weather change occurs, or the like.

Assume that, for example, the current point C in a captured image of a previous frame was located at the position of the plot 60A of the low color temperature, whereas the current point C in a captured image of the present frame is located at the position of the plot 62A of the high color temperature. In this case, the current point C' of the captured image of the present frame after white balance correction, multiplied by the white balance gain computed from the captured image of the previous frame, is shifted to a position of a plot 62B. Therefore, the plot 62A as the current point C, which was located inside the white detection frame 50 in the captured image before the white balance correction, is located at a position of the plot 62B out of the white detection frame 50 in the captured image after the white balance correction. Therefore, the image quality may sometimes deteriorate when the white balance gain is computed by using the plot 62B as the current point C' of the captured image after the white balance correction.

In contrast, according to the imaging device 10 of the present embodiment, the white balance gain is computed by using the first image obtained by the inverse gain correction unit 40, which corresponds to a captured image before the white balance correction, instead of using the captured image whose white balance has been corrected. Therefore, in the imaging device 10 of the present embodiment, the white balance gain can be computed by using color difference information of the plot 62A, which is the current point C before the white balance correction, instead of using color difference information of the plot 62B which is the current point C' after the white balance correction. Therefore, the imaging device 10 according to the present embodiment can compute the white balance gain with high accuracy even in the case where the color temperature of the subject greatly changes between the frames.

In addition, similarly, assume a case where the current point C was located at the position of the plot 62A in a captured image of a previous frame, but the current point C is shifted to a position of a plot 64A of a color temperature of the blue sky in a captured image of a present frame. Then, for example, assume that a white balance gain computed from the captured image of the previous frame is a white balance gain for correcting the color temperature at the position of the plot 62A to the position of the goal point P. In this case, in the captured image before white balance correction, the plot 64A as the current point C of the present frame, which was outside the white detection frame 50, is located at a plot 64B in the white detection frame 50 by performing the white balance correction with the white balance gain. Therefore, the image quality is sometimes degraded when the white balance gain is computed by using the plot 64B as the current point C' of the captured image after the white balance correction. This is because a plot outside the frame of the white detection frame 50 is treated as the target to be subjected to the white balance gain computation in the captured image before the white balance correction.

In contrast, in the imaging device 10 according to the present embodiment, the white balance gain is computed by using the first image obtained by the inverse gain correction unit 40, which corresponds to a captured image before the white balance correction, instead of using the captured image whose white balance correction has been corrected. Therefore, in the imaging device 10 of the present embodiment, a plot located outside the frame of the white detection frame 50, such as the plot 64A, before the white balance correction can be set as a plot excluded from the target to be subjected to the white balance gain computation. Therefore, the imaging device 10 according to the present embodiment can compute the white balance gain with high accuracy even in the case where the color temperature of the subject greatly changes between the frames.

In this manner, in the imaging device 10 of the present embodiment, even in the case where the color temperature of the subject greatly changes, it is possible to suppress the current point C, which is the integrated value of the luminance values of RGB of the region to be subjected to the white balance calculation, from being shifted from the inside to the outside or from the outside to the inside of the white detection frame 50 set in advance. Therefore, in the imaging device 10 of the present embodiment, an accurate white balance gain can be computed even in the case where the color temperature of the subject greatly changes.

Figure 3B:
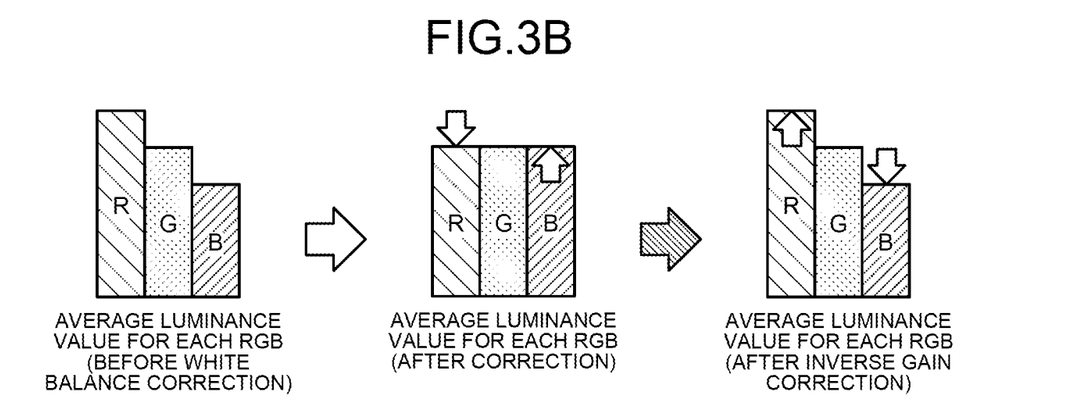
FIG. 3B is an explanatory view illustrating an example of a change in luminance values of RGB due to the white balance correction.

FIG. 3B is an explanatory view illustrating an example of a change in luminance values of RGB due to the white balance correction. For example, as illustrated in FIG. 3B, assume a case where an average value of luminance values of RGB at the current point C of a captured image is corrected to substantially the same value by performing the white balance correction. In the present embodiment, a white balance gain is calculated after the average luminance value for each of RGB is restored to the state before the white balance correction by performing inverse gain correction.

In this manner, the calculation unit 42 of the present embodiment computes the white balance gain on the basis of color difference information in the white detection frame 50 in the first image that is not a captured image after the white balance correction but is a captured image before the white balance correction.

Therefore, it is possible to suppress the image quality degradation caused by the deviation of white balance or the like due to the change in the color temperature of the subject in the imaging device 10 of the present embodiment.

On the other hand, a white balance gain is calculated by using color difference information of the captured image after the white balance correction in a conventional technique. Therefore, the image quality degradation sometimes occurs in the conventional technique.

Figure 4:
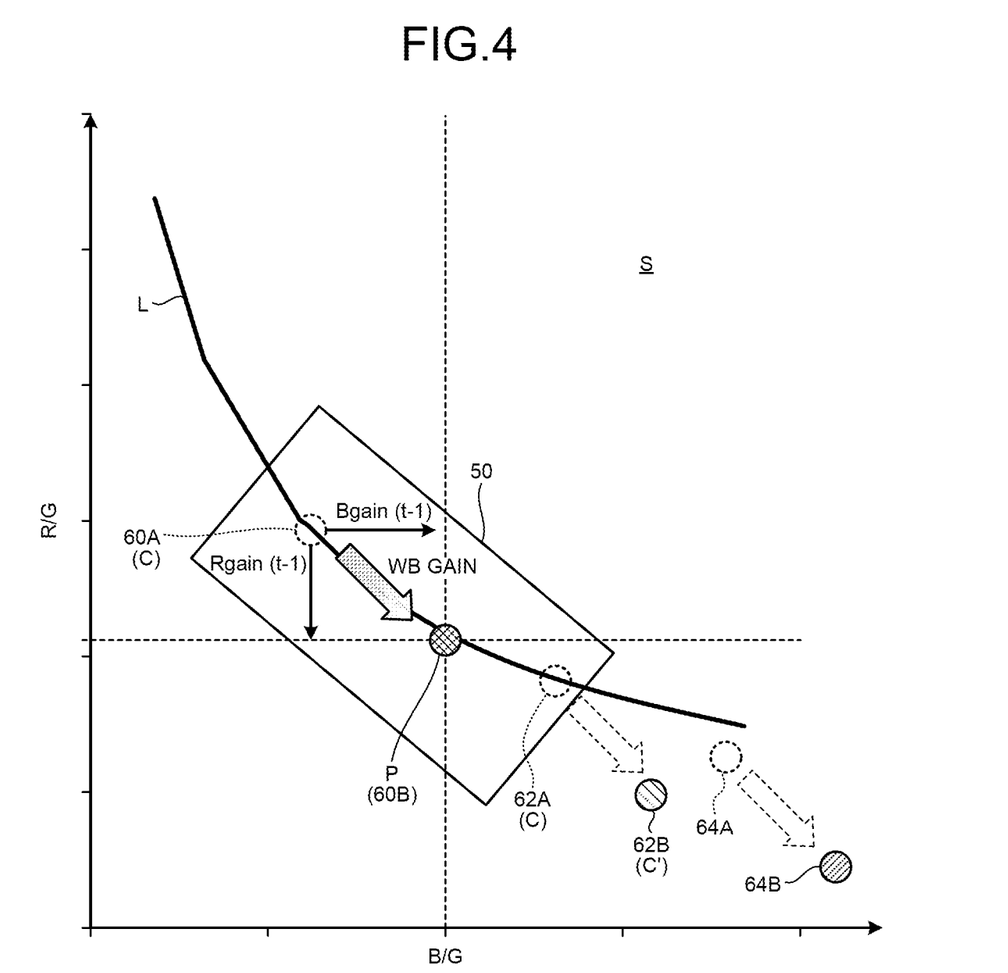
FIG. 4 is an explanatory view illustrating an example of conventional white balance correction.

FIG. 4 is an explanatory view illustrating an example of conventional white balance correction. In the white balance correction by conventional feedback control, the white balance gain is calculated by using the captured image having been subjected to the white balance correction.

For example, assume that a color temperature of a subject greatly changes between frames. For example, assume a scene where the current point C was located at a position of the plot 60A of the low color temperature in a captured image of a previous frame, but the current point C is located at a position of the plot 62A of the high color temperature in a captured image of a present frame. Specifically, assume that the color temperature of the subject at a certain time greatly changes from the low color temperature such as a road surface in the evening to the high color temperature such as an indoor white light source or a shaded road surface.

In this case, a current point C' of the captured image of the present frame after the white balance correction, multiplied by the white balance gain computed from the captured image of the previous frame, is shifted from the position of the plot 62A to a position of a plot 62B. Therefore, the current point C, which was inside the white detection frame 50 in the captured image before the white balance correction, deviates from the white detection frame 50 at the current point C' of the captured image after the white balance correction. That is, the current point C' obtained from color difference information of the frame immediately after the color temperature change deviates from the white detection frame 50. Therefore, in the conventional technique, it is difficult to correctly compute the white balance gain in this case, and image quality degradation sometimes occurs.

In addition, such image quality degradation occurs particularly significantly when the color temperature of the subject greatly changes between frames in the conventional technique.

That is, the white balance gain is calculated from the captured image of the previous frame in the white balance correction by the feedback control. Since the white balance gain to be used in a captured image of a next frame is calculated by using the captured image after the white balance correction in the conventional technique, there is a case where significant image quality degradation occurs particularly in an environment where a color temperature of a light source of the subject rapidly changes.

Figure 5A:
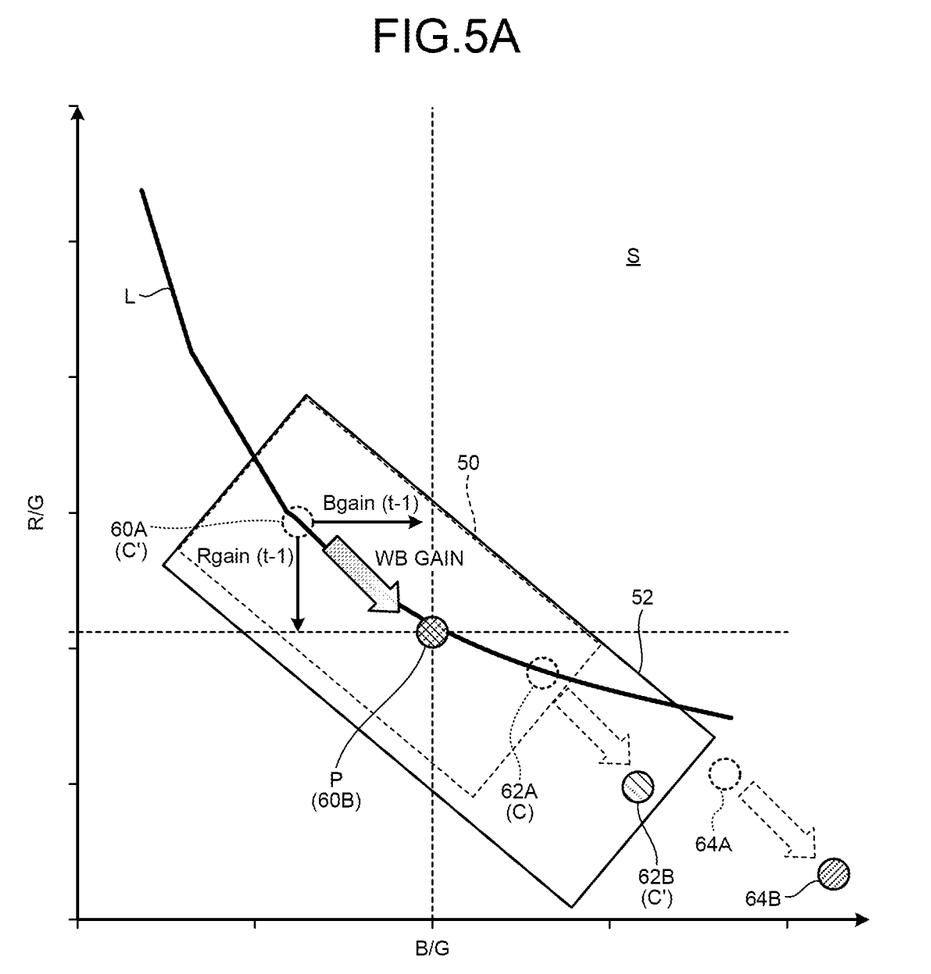
FIG. 5A is an explanatory view of a conventional technique.
Figure 5B:
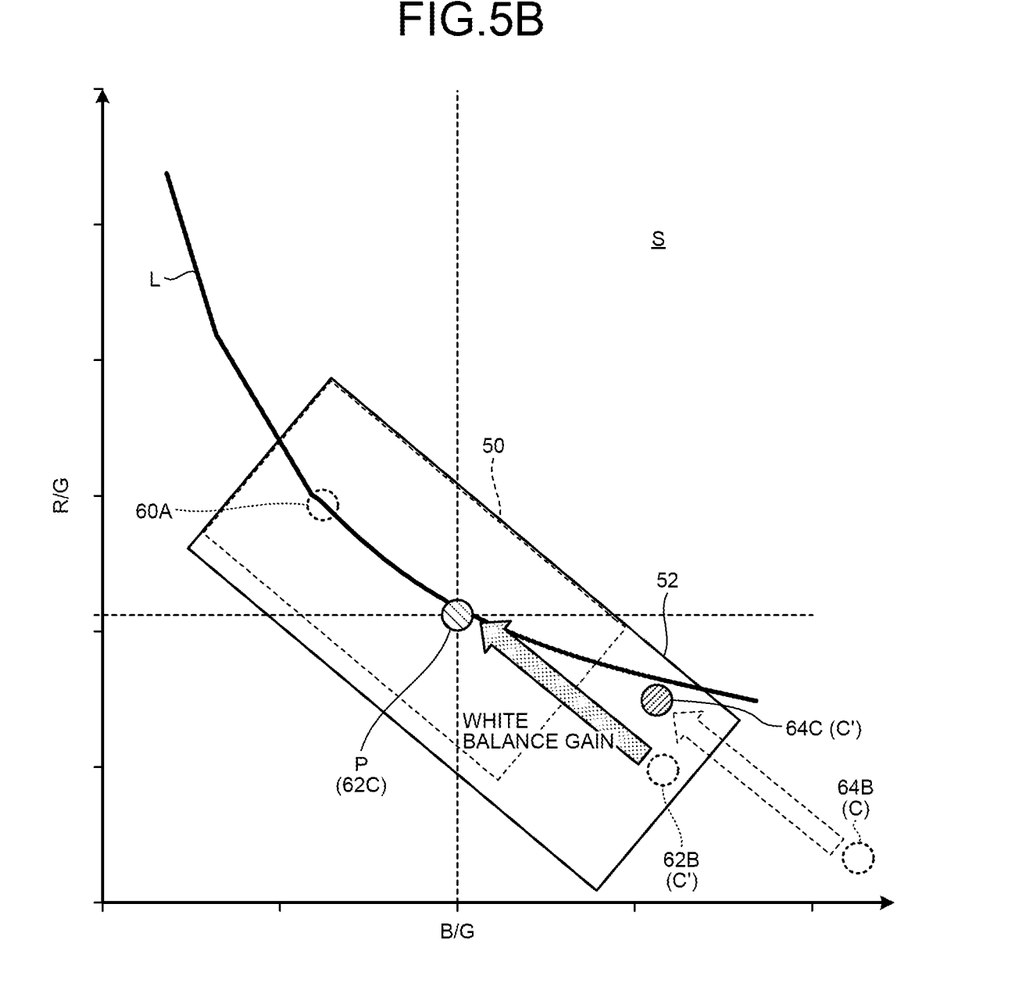
FIG. 5B is an explanatory view of the conventional technique.

In addition, as a conventional technique of performing white balance correction by feedback control, a technique of enlarging a white detection frame 50 in accordance with a change in a color temperature of a light source has been disclosed. However, it is difficult to suppress image quality degradation even in a case where the white detection frame 50 is enlarged in accordance with the change in the color temperature of the light source.

FIGS. 5A and 5B are explanatory views of the conventional technique in which the white detection frame 50 is enlarged and used.

In this conventional technique as well, similarly to the above-described conventional technique, a captured image of a next frame is corrected by using a white balance gain calculated from a captured image in which white balance correction has been corrected. There is a case where a plot of color difference information after the white balance correction deviates from the white detection frame 50 serving as a reference due to the white balance correction. In this case, the white detection frame 50 is enlarged so as to include the corrected plot of the color difference information, which was inside the white detection frame 50 before the white balance correction, in the conventional technique.

This will be specifically described with reference to FIG. 5A. For example, assume a case where a current point C' was located at a position of a plot 60A of a low color temperature in a captured image of a previous frame. Then, assume that a white balance gain for correcting the current point C' of the plot 60A of the low color temperature to a goal point P is calculated. Then, assume a scene where a current point C of a captured image of a next frame is at a position of a plot 62A of a high color temperature. In this case, a current point C' of the captured image of the present frame after the white balance correction, multiplied by the white balance gain computed from the captured image of the previous frame, is shifted from the position of the plot 62A to a position of a plot 62B.

In this case, in the conventional technique, the white detection frame 50 is enlarged to a white detection frame 52 so as to include the plot 62B of the current point C' after the correction that corresponds to the plot 62A of the current point C which was inside the white detection frame 50 before the correction. Then, in the conventional technique, a white balance gain to be used in the captured image of the next frame is calculated by using the captured image after the white balance correction and the enlarged white detection frame 52. Therefore, the captured image of the next frame is multiplied by the white balance gain calculated using the plot in the enlarged white detection frame 52. Therefore, in the conventional technique, there is a case where a mismatch occurs between a range of the white detection frame 50 set in advance and a color temperature of a captured image used as a target to be subjected to the white balance gain as the white balance correction by the feedback control is repeated.

Specifically, as illustrated in FIG. 5B, assume a case where the current point C of a captured image before white balance correction is at a position of a plot 64B outside the enlarged white detection frame 52. In addition, assume a case where the current point C' of a captured image after the white balance correction of a previous frame was located at the position of the plot 62B. In this case, a white balance gain is a value for bringing color difference information of the position of the plot 62B closer to the goal point P. Therefore, the captured image in which the current point C is at the position of the plot 64B is corrected to obtain the current point C' is at a position of a plot 64C in the enlarged white detection frame 52 by the white balance correction.

In this case, when the white balance gain to be used in the captured image of the next frame is computed by using the current point C' of the captured image after the white balance correction, color difference information of a plot that is not to be included in the target to be subjected to the white balance gain computation sometimes falls within the white detection frame 52 to be set as the target to be subjected to the white balance gain computation. Similarly, color difference information of a plot that is to be originally included in the target to be subjected to the white balance computation is sometimes not included in the white detection frame 52 in this conventional technique.

That is, in this conventional technique, it is considered that a white balance gain converges on a captured image of a frame after white balance correction by using a color temperature after the white balance correction of a captured image captured under an environment of a light source that does not change with time. For example, it is considered that the white balance gain converges within several frames to several tens of frames. However, when the color temperature of the light source greatly changes, a white region that is to originally fall within the white detection frame 50 set in advance is sometimes not included in the white detection frame 52. Therefore, it is sometimes difficult to calculate an appropriate white balance gain in the conventional technique.

Therefore, even in the conventional technique of enlarging and correcting the white detection frame 50 in the white balance correction by the feedback control, there is a case where the image quality degradation occurs, which makes it difficult to perform appropriate white balance computation.

In contrast, in the imaging device 10 of the present embodiment, the white balance gain is computed by using the first image obtained by the inverse gain correction unit 40, which corresponds to a captured image before the white balance correction. Therefore, in the imaging device 10 of the present embodiment, it is possible to suppress the current point C, which is not to originally fall within the white detection frame 50, from falling within the white detection frame 50 even in a case where a color temperature between frames greatly changes on the color temperature space S. In addition, it is possible to suppress the current point C that is to originally fall within the white detection frame 50 from deviating from the white detection frame 50 in the imaging device 10 of the present embodiment. Therefore, the white balance gain can be computed with high accuracy in the imaging device 10 of the present embodiment, so that the image quality degradation can be suppressed.

In addition, the color temperature of the subject greatly changes depending on an imaging environment and brightness. Therefore, a setting of the white detection frame 50 has been conventionally changed according to the imaging environment. For example, a range of the white detection frame 50 is made variable in conjunction with auto exposure (AE). Specifically, sunlight is a main light source in a case where the daytime illuminance is high, and thus, the white detection frame 50 is set to be narrow. On the other hand, there are various light sources including a fluorescent lamp at night, the white detection frame 50 is set to be wide. Setting the white detection frame 50 to be narrow means setting the white detection frame 50 in a region closer to the black-body radiation curve L in the color temperature space S. Setting the white detection frame 50 to be wide means enlarging the white detection frame 50 to a region farther away from the black-body radiation curve L in the color temperature space S.

In this manner, even in the case where the range of the white detection frame 50 is made variable in conjunction with AE, the white balance correction following the change in the color temperature of the subject can be performed by employing the configuration in which the white balance processing unit 38 including the inverse gain correction unit 40 of the present embodiment is provided.

Next, a flow of information processing executed by the imaging device 10 according to the present embodiment will be described.

Figure 6:
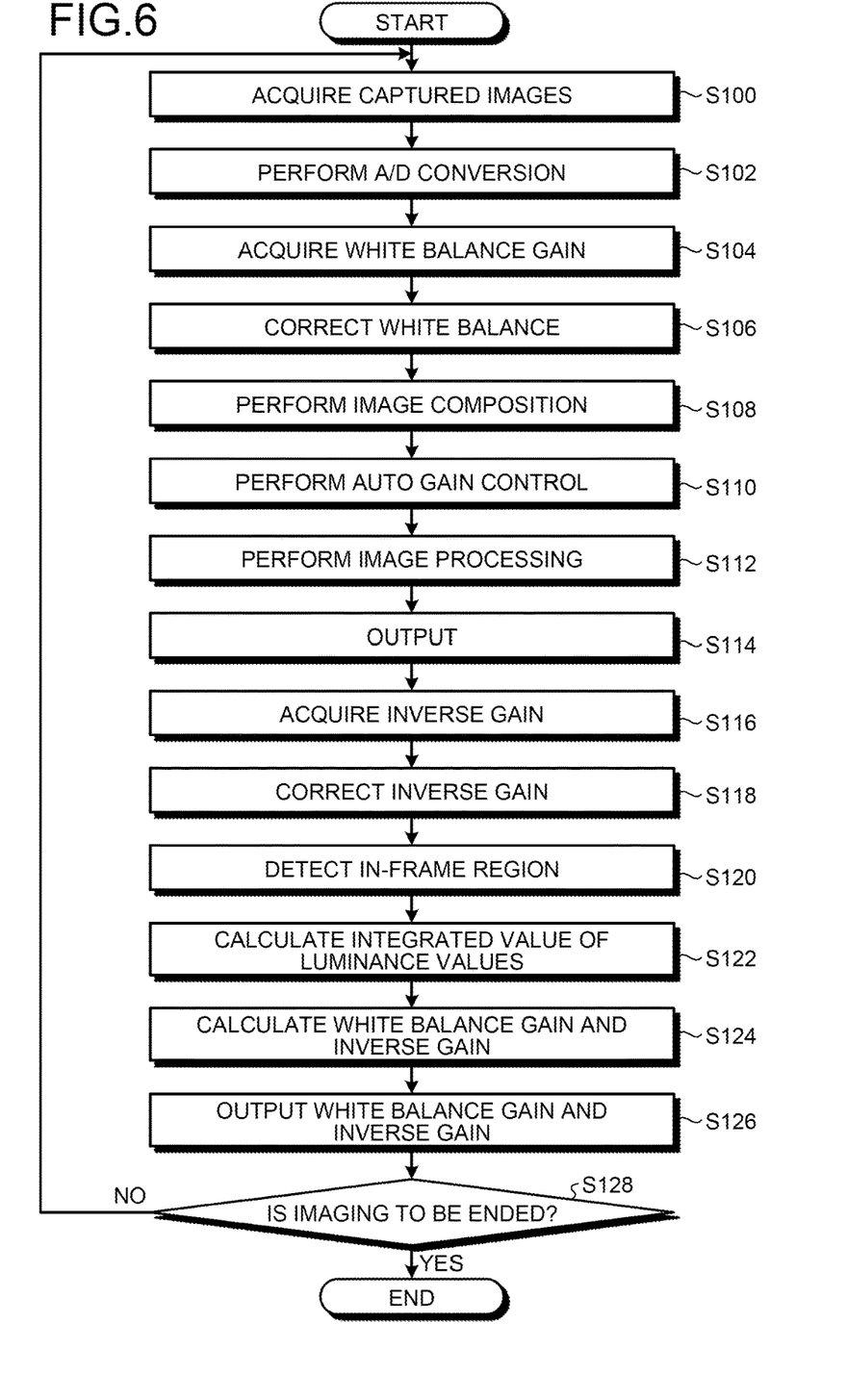
FIG. 6 is a flowchart illustrating an example of information processing according to the present embodiment.

FIG. 6 is a flowchart illustrating an example of the information processing executed by the imaging device 10 according to the present embodiment.

The imaging element 18 acquires an analog signal of a captured image (Step S100). The A/D converter 20 converts the analog signal output from the imaging element 18 into a captured image as digital data (Step S102).

The white balance correction unit 22 acquires from the white balance calculation unit 46 a white balance gain calculated from the first image of a previous frame in Step S124, which will be described later (Step S104). The white balance correction unit 22 corrects white balance of the captured image, which has been acquired in Step S100 and subjected to A/D conversion in Step S102, by using the white balance gain acquired in Step S104 (Step S106).

The image composition unit 24 performs composition of the captured images being subjected to the white balance correction in Step S106 and having mutually different exposure levels (Step S108). The AGC 30 adjusts luminance or brightness of the composite image obtained in Step S108, and outputs the resultant to the image processing unit 32 and the white balance processing unit 38 (Step S110). The image processing unit 32 performs various types of known image processing, such as γ correction and contrast correction, on the captured image received from the AGC 30 (Step S112), and outputs the resultant to the outside of the imaging device 10 (Step S114). Note that the composition processing of the captured images in Step S108 is required only in a case where imaging is performed multiple times as in an HDR-compatible sensor or the like. In a configuration in which imaging is not performed multiple times, the processing of Step S108 is unnecessary.

The inverse gain correction unit 40 acquires an inverse gain calculated in Step S124, which will be described later, from the delay processing unit 48 (Step S116). The inverse gain correction unit 40 executes inverse gain correction of multiplying the captured image after the white balance correction, which has been subjected to automatic gain control in Step S110, by the inverse gain acquired in Step S116 (Step S118). Through the processing in Step S118, the first image is generated by restoring the captured image having been subjected to the white balance correction in Step S106 to a captured image before the white balance correction.

The detection unit 44 detects pixels from an in-frame region of the white detection frame 50 in the first image which has been restored to a captured image before the white balance correction as a result of the inverse gain correction by the inverse gain correction unit 40 (Step S120). In other words, the detection unit 44 detects pixels each having color difference information within the white detection frame 50 in the first image. Then, the detection unit 44 calculates an integrated value of luminance values for each of RGB of each of the detected pixels (Step S122).

The white balance calculation unit 46 calculates a white balance gain and an inverse gain of the white balance gain on the basis of the color temperature of the in-frame region that is a region in the white detection frame 50 in the first image generated in Step S118 (Step S124). That is, the white balance calculation unit 46 calculates the white balance gain and the inverse gain by using the integrated value of the luminance values for each of RGB calculated in Step S122.

Then, the white balance calculation unit 46 outputs the white balance gain calculated in Step S124 to the white balance correction unit 22. In addition, the white balance calculation unit 46 outputs the inverse gain calculated in Step S124 to the inverse gain correction unit 40 via the delay processing unit 48 (Step S126).

Next, the imaging device 10 determines whether or not to end imaging (Step S128). For example, the imaging device 10 executes the determination of Step S128 by determining whether or not a predetermined signal indicating the imaging end has been received. If a negative determination is made in Step S128 (Step S128: No), the process returns to Step S100. If an affirmative determination is made in Step S128 (Step S128: Yes), this routine is ended.

As described above, the imaging device 10 of the present embodiment includes the calculation unit 42, the white balance correction unit 22, and the inverse gain correction unit 40. The calculation unit 42 calculates the white balance gain for the white balance correction and the inverse gain of this white balance gain on the basis of the first image. The white balance correction unit 22 corrects the white balance of the captured image on the basis of the white balance gain. The inverse gain correction unit 40 outputs, to the calculation unit 42, the first image subjected to the inverse gain correction of multiplying the captured image having been subjected to the white balance correction by the inverse gain.

In this manner, in the imaging device 10 of the present embodiment, the white balance gain is calculated in the white balance correction by the feedback control on the basis of the first image that is not the captured image after the white balance correction but the captured image before the white balance correction obtained by the inverse gain correction.

Therefore, the image quality degradation can be suppressed in the imaging device 10 of the present embodiment.

Note that the configuration in which the image composition unit 24 is arranged between the white balance correction unit 22 and the inverse gain correction unit 40 in a data output direction has been described as an example in the present embodiment as described with reference to FIG. 1. The data output direction is a direction of an arrow X depicted in FIG. 1.

However, it is sufficient for the image composition unit 24 to be arranged on the downstream side of the white balance correction unit 22 in the data output direction. For example, the image composition unit 24 may be arranged at a position A between the AGC 30 and the inverse gain correction unit 40, a position B between the inverse gain correction unit 40 and the image processing unit 32, or the like in the data output direction. Note that the image composition processing is required only in a case where imaging is performed multiple times as in an HDR-compatible sensor or the like. Therefore, the image composition unit 24 is unnecessary in a configuration in which imaging is not performed multiple times.

The HDR image sensor, which is an example of the image composition unit 24, can capture a high-quality image as compared with a conventional single-exposure image sensor. However, the HDR image sensor performs unique image processing for multiple exposure, and thus, linearity of luminance or saturation is not guaranteed in some cases. For example, in a case where processing such as luminance offset is performed, the linearity is sometimes lost. For example, assume a case where a luminance level of RGB is set as R:G:B=20:30:10. When "+20" is added to this luminance level for each of RGB as a luminance offset, the luminance level of RGB becomes R:G:B=40:60:30. Therefore, a ratio of RGB is changed from the conventional state, and a white balance gain is sometimes not calculated correctly.

Therefore, in the case of employing the configuration in which the image composition unit 24 is provided, the image composition unit 24 is preferably arranged on the downstream side of the white balance correction unit 22 in the data output direction. That is, the white balance correction unit 22 is preferably arranged at a preceding stage of the image composition unit 24. Since the white balance correction unit 22 is arranged at the preceding stage of the image composition unit 24, the white balance correction unit 22 can perform the white balance correction on a captured image in which the linearity of the luminance values of RGB is maintained.

In addition, assume a configuration in which a position of the image composition unit 24 in the image sensor 14 is arranged at a stage subsequent to the white balance correction unit or a position of the image composition unit 24 in the signal processing unit 16 is arranged at the position A (see FIG. 1) in the imaging device 10 having the configuration in which the white balance correction unit 22 is arranged at the preceding stage of the white balance processing unit 38. In the imaging device 10 configured in this manner, it is necessary to perform white balance correction by feedback control, instead of feedforward control. In the imaging device 10 of the present embodiment, the white balance gain is computed by the first image corresponding to a captured image before the white balance correction, in the white balance correction by the feedback control.

Therefore, in the imaging device 10 of the present embodiment, the image quality degradation can be suppressed even in the case where the image composition unit 24 is provided.

Note that the embodiment has been described as above, the embodiment has been presented as an example, and is not intended to limit the scope of the invention. For example, the imaging device 10 of the present embodiment may have a configuration that does not include the image composition unit 24. Specifically, in a case where the image sensor 14 that is not compatible with the HDR is used, the imaging device 10 may have a configuration that does not include the image composition unit 24. In addition, the above-described novel embodiment can be implemented in various other modes, and various omissions, substitutions, and changes can be made within a scope not departing from the gist of the invention. The above embodiment is included in the scope or gist of the invention, and is included in the invention described in the claims and the equivalent scope thereof.

With the imaging device, the imaging method, the recording medium, and the mobile body according to the present disclosure, the image quality degradation can be suppressed.

What is claimed is:

1. A vehicular imaging device comprising:
a calculator that calculates a white balance gain and an inverse gain on the basis of a first image, the white balance gain being used for correcting white balance, the inverse gain being a reciprocal number of the white balance gain;
a white balance corrector that corrects white balance of a captured image on the basis of the white balance gain;
an inverse gain corrector that generates the first image and outputs the generated first image to the calculator, the captured image whose white balance has been corrected is input to the inverse gain corrector at a first timing, the inverse gain is input to the inverse gain corrector at a second timing, the first image being generated by performing inverse gain correction in which the captured image whose white balance has been corrected is multiplied by the inverse gain; and
a delay processor that delays the second timing at which the inverse gain is input to the inverse gain corrector to coincide with the first timing at which the captured image whose white balance has been corrected is input to the inverse gain corrector.

2. The vehicular imaging device according to claim 1, wherein the calculator includes:
a detector that detects an in-frame region being a color temperature region within a white detection frame, the white detection frame representing a target region where white balance is to be corrected in a color temperature space; and
a white balance calculator that calculates the white balance gain and the inverse gain of the white balance gain on the basis of a color temperature of the in-frame region in the first image.

3. The vehicular imaging device according to claim 2, wherein
the detector calculates an integrated value of luminance values for each of color components of each pixel in the in-frame region of the first image, and
the white balance calculator calculates the white balance gain and the inverse gain by using the integrated value.

4. The vehicular imaging device according to claim 1, further comprising a compositor that performs composition of captured images whose white balance has been corrected, the captured images having different exposure levels.

5. The vehicular imaging device according to claim 1, wherein
the delay processor receives the inverse gain from the calculator, and outputs the inverse gain to the inverse gain corrector after holding the inverse gain for a time corresponding to at least one frame.

6. A mobile body comprising:
a calculator that calculates a white balance gain and an inverse gain on the basis of a first image, the white balance gain being used for correcting white balance, the inverse gain being a reciprocal number of the white balance gain;
a white balance corrector that corrects white balance of a captured image on the basis of the white balance gain;
an inverse gain corrector that generates the first image and outputs the generated first image to the calculator, the captured image whose white balance has been corrected is input to the inverse gain corrector at a first timing, the inverse gain is input to the inverse gain corrector at a second timing, the first image being generated by performing inverse gain correction in which the captured image whose white balance has been corrected is multiplied by the inverse gain; and
a delay processor that delays the second timing at which the inverse gain is input to the inverse gain corrector to coincide with the first timing at which the captured image whose white balance has been corrected is input to the inverse gain corrector.

7. The mobile body according to claim 6, wherein
the delay processor receives the inverse gain from the calculator, and outputs the inverse gain to the inverse gain corrector after holding the inverse gain for a time corresponding to at least one frame.

* * * * *